(12) United States Patent  
Ren et al.

(10) Patent No.: US 12,013,861 B2
(45) Date of Patent: Jun. 18, 2024

(54) METHOD AND APPARATUS FOR RETRIEVING AND ENUMERATING OBJECT METADATA IN DISTRIBUTED STORAGE SYSTEM

(71) Applicant: INSPUR SUZHOU INTELLIGENT TECHNOLOGY CO., LTD., Jiangsu (CN)

(72) Inventors: Pengxiang Ren, Jiangsu (CN); Yonggang Hu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/044,965

(22) PCT Filed: Jun. 30, 2021

(86) PCT No.: PCT/CN2021/103414
§ 371 (c)(1),
(2) Date: Mar. 10, 2023

(87) PCT Pub. No.: WO2022/052586
PCT Pub. Date: Mar. 17, 2022

(65) Prior Publication Data
US 2023/0267124 A1 Aug. 24, 2023

(30) Foreign Application Priority Data
Sep. 11, 2020 (CN) .......................... 202010957725.5

(51) Int. Cl.
*G06F 16/2457* (2019.01)
*G06F 16/215* (2019.01)
*G06F 16/22* (2019.01)

(52) U.S. Cl.
CPC ...... *G06F 16/24573* (2019.01); *G06F 16/215* (2019.01); *G06F 16/2246* (2019.01)

(58) Field of Classification Search
CPC .......... G06F 16/24573; G06F 16/2246; G06F 16/215; G06F 16/21
See application file for complete search history.

(56) References Cited

U.S. PATENT DOCUMENTS 10,949,387 B1 *  3/2021  Grider ..................... G06F 16/14
2003/0004938 A1 *  1/2003  Lawder ............... G06F 16/2264
(Continued)

FOREIGN PATENT DOCUMENTS

CN     101276334 A     10/2008
CN     101482839 A     7/2009
(Continued)

OTHER PUBLICATIONS

International Search Report for PCT/CN2021/103414 mailed on Sep. 8, 2021.
(Continued)

*Primary Examiner* — Brittany N Allen
*Assistant Examiner* — William P Bartlett
(74) *Attorney, Agent, or Firm* — Dennemeyer & Associates LLC; Victoria Friedman

(57) ABSTRACT

Disclosed are a method and apparatus for retrieving and enumerating object metadata in a distributed storage system. The method includes: defining and configuring metadata of objects, and counting the number N of types of the metadata; constructing a metadata retrieval tree according to the metadata and the number N of the types of the metadata, each Mth node being associated with an Mth linked list; configuring objects in the Mth linked lists, the objects conforms to all metadata in metadata arrays in the Mth nodes; and configuring an index based on the metadata, pointing to a
(Continued)

specified target node via the metadata retrieval tree according to the index, determining a target linked list according to the target node, and providing enumerated objects by the target linked list.

19 Claims, 2 Drawing Sheets

(56) References Cited

U.S. PATENT DOCUMENTS

| | | | |
|---|---|---|---|
| 2013/0010790 A1* | 1/2013 | Shao | H04L 12/185 370/390 |
| 2017/0177652 A1 | 6/2017 | Danilov et al. | |
| 2020/0233839 A1* | 7/2020 | Desai | G06F 16/1724 |
| 2020/0327135 A1* | 10/2020 | Turner | G06F 16/9535 |

FOREIGN PATENT DOCUMENTS

| | | | |
|---|---|---|---|
| CN | 101551826 A | 10/2009 | |
| CN | 102521386 A | 6/2012 | |
| CN | 105930345 A | 9/2016 | |
| CN | 108897859 A | 11/2018 | |
| CN | 109299190 A | 2/2019 | |
| CN | 109684282 A | 4/2019 | |
| CN | 109830285 A | 5/2019 | |
| CN | 111984691 A | 11/2020 | |

OTHER PUBLICATIONS

Search report from Chinese application No. 202010957725.5 filed on Sep. 11, 2020.

* cited by examiner

METHOD AND APPARATUS FOR RETRIEVING AND ENUMERATING OBJECT METADATA IN DISTRIBUTED STORAGE SYSTEM

CROSS-REFERENCE TO RELATED APPLICATIONS

This is a 35 U.S.C. 371 National Stage Patent Application of International Application No. PCT/CN2021/103414, filed Jun. 30, 2021, which claims priority to Chinese application 202010957725.5, filed Sep. 11, 2020, each of which is hereby incorporated by reference in its entirety.

TECHNICAL FIELD

The present disclosure relates to the technical field of object retrieval, in particular to a method and apparatus for retrieving and enumerating object metadata in a distributed storage system.

BACKGROUND

The object storage technology is increasingly becoming a key storage technology used by private and public cloud service providers, and it is a redundant and scalable data storage technology that uses clusters of standardized servers to store petabytes of data.

An object storage system uses objects as the basic unit of storage, and each object is a composite of data and a set of data attributes. When an object is created, metadata is used to represent the data attributes, such as name, creation time, owner, creator, size, and other user-defined attributes. Generally, objects are stored in an object storage device. The object storage device may manage the objects stored thereon and metadata associated with these objects.

In a distributed object storage system, objects are stored in a flat structure, that is, all objects under a user are on the same layer and there is no directory tree structure in a file system. Since there is no retrieval tree to support precise enumeration, only full enumeration may be used during retrieval, but full enumeration leads to the consumption of a large amount of Central Processing Unit (CPU), disk resources, and long retrieval time. For example, sometimes we need to find all objects with certain metadata information based on the metadata, or sometimes we need to list all objects with a specified prefix. Currently, objects are fully enumerated first and then matched as needed.

SUMMARY

The present disclosure provides a method and apparatus for retrieving and enumerating object metadata in a distributed storage system, aiming to solve the problem that during the retrieval process in which the distributed object storage system first fully enumerates objects and then performs retrieval by index, the full enumeration results in consumption of a large number of CPU and disk resources and long retrieval time.

In order to achieve the above purpose, the present disclosure provides a method for retrieving and enumerating object metadata in a distributed storage system. The method includes: defining and configuring metadata of objects, and counting the number N of types of the metadata; constructing a metadata retrieval tree according to the metadata and the number N of the types of the metadata, wherein the metadata retrieval tree includes a zeroth node to an Nth node, the number of the zeroth node is configured as one, an Mth node belonging to an (M−1)th node (M ∈ an integer, 1<=M<=N), the Mth node is configured with an ordered metadata array including M metadata in order, each Mth node is associated with an Mth linked list; configuring objects in the Mth linked lists, wherein the objects conforms to all metadata in the metadata arrays in the Mth nodes; and configuring an index according to the metadata, pointing to a specified target node via the metadata retrieval tree according to the index, determining a target linked list according to the target node, and providing enumerated objects by the target linked list.

In an embodiment, the zeroth node of the metadata retrieval tree is configured with functions of node addition, node deletion and node modification.

In an embodiment, the node addition includes: creating a target first node after an existing first node, and automatically adding a target second node, a target third node up to a target (N+1)th node; adding empty metadata in the target first node, and configuring empty metadata at destination locations in metadata arrays of a second node up to an (N+1)th node; specifying first target metadata to be added to the target first node; and replacing the empty metadata with the first target metadata.

In an embodiment, the node deletion includes: specifying a first node to be deleted, and acquiring second target metadata in the first node to be deleted; deleting second target metadata in the first node up to the Nth node; and comparing a metadata array of any Mth node with the second target metadata deleted with metadata arrays of all (M−1)th nodes.

In an embodiment, the node modification includes: specifying a first node to be modified, and acquiring third target metadata in the first node to be modified; replacing third target metadata in the first node up to the Nth node with empty metadata; specifying fourth target metadata to be modified to; and replacing the empty metadata with the fourth target metadata.

In an embodiment, the defining and configuring metadata of objects, and counting the number N of types of the metadata includes: constructing, for each object, a metadata list including N empty bits; and performing one-to-one correspondence on the N empty bits and N metadata, and configuring different information for the empty bits to indicate whether the object include the metadata corresponding to the empty bits.

In an embodiment, the empty bits are configured as 0 or 1, the metadata list is configured with a location counting unit, and the location counting unit is configured to determine a total value of numbers in the N empty bits in the metadata list.

In an embodiment, each Mth linked list is configured with a unique object processing unit, and the object processing unit is configured to add an object to the Mth linked list, delete an object from the Mth linked list, and perform object transfer.

In an embodiment, adding an object to the Mth linked list includes: establishing mapping between the object processing units and the values, after uploading the object, determining an object processing unit according to a value counted by the location counting unit, and saving, by the object processing unit, the object into the Mth linked list; deleting an object from the Mth linked list includes: determining an object to be deleted and a value, transmitting a deletion instruction to a corresponding object processing unit, reading, by the object processing unit, an object name from the deletion instruction, and deleting the corresponding object; and performing object transfer includes: executing any of the following instructions: a metadata addition instruction, a metadata deletion instruction and a metadata modification instruction, and transmitting an object name of the metadata addition instruction or the metadata deletion instruction or the metadata modification instruction to a corresponding object processing unit; deleting, by the object processing unit, an object from Mth linked list; and executing any one of the following instructions: the metadata addition instruction, the metadata deletion instruction and the metadata modification instruction, modifying empty bits of a metadata list, acquiring a value of the modified metadata list, transferring the object to a corresponding target object processing unit based on the value, and adding the object by the object processing unit.

The present disclosure further provides an apparatus for retrieving and enumerating data object metadata in a distributed storage system. The apparatus includes: a processing unit, a storage unit, a bus unit, an input unit, an output unit, and an interface unit, the bus unit is configured to connect the processing unit, the storage unit, the input unit, the output unit, and the interface unit; the storage unit is configured to store at least one instruction, and the at least one instruction is used for implementing the method and apparatus for retrieving and enumerating the object metadata in the distributed storage system; the processing unit is configured to execute the at least one instruction; the input unit being configured to input object processing parameters to the at least one instruction; the output unit being configured to display a result of the at least one instruction.

The method and apparatus for retrieving and enumerating the object metadata in the distributed storage system provided by the present disclosure have the following beneficial effects:

(1) the target linked list is associated through the metadata retrieval tree quickly, and object enumeration is provided by the target linked list, so that fast and targeted object enumeration is achieved.

(2) The consumption of CPU resources and storage resources caused by conventional retrieval through full enumeration may be effectively avoided, and the CPU resources and the storage resources are saved.

(3) By means of partial enumeration instead of full enumeration, the time consumption of the enumeration may be effectively reduced, the retrieval time is shortened and the retrieval efficiency is improved accordingly.

BRIEF DESCRIPTION OF THE DRAWINGS

In order to more clearer illustrate the technical solutions in the embodiments of the present disclosure or in the related art, the drawings used in the description of the exemplary embodiments or the related art will be briefly described hereinafter. Apparently, the drawings described hereinafter merely illustrate some embodiments of the present disclosure. A person of ordinary skill in the art may also derive other drawings based on the structures shown in the drawings described herein without any creative effort.

Figure 1:
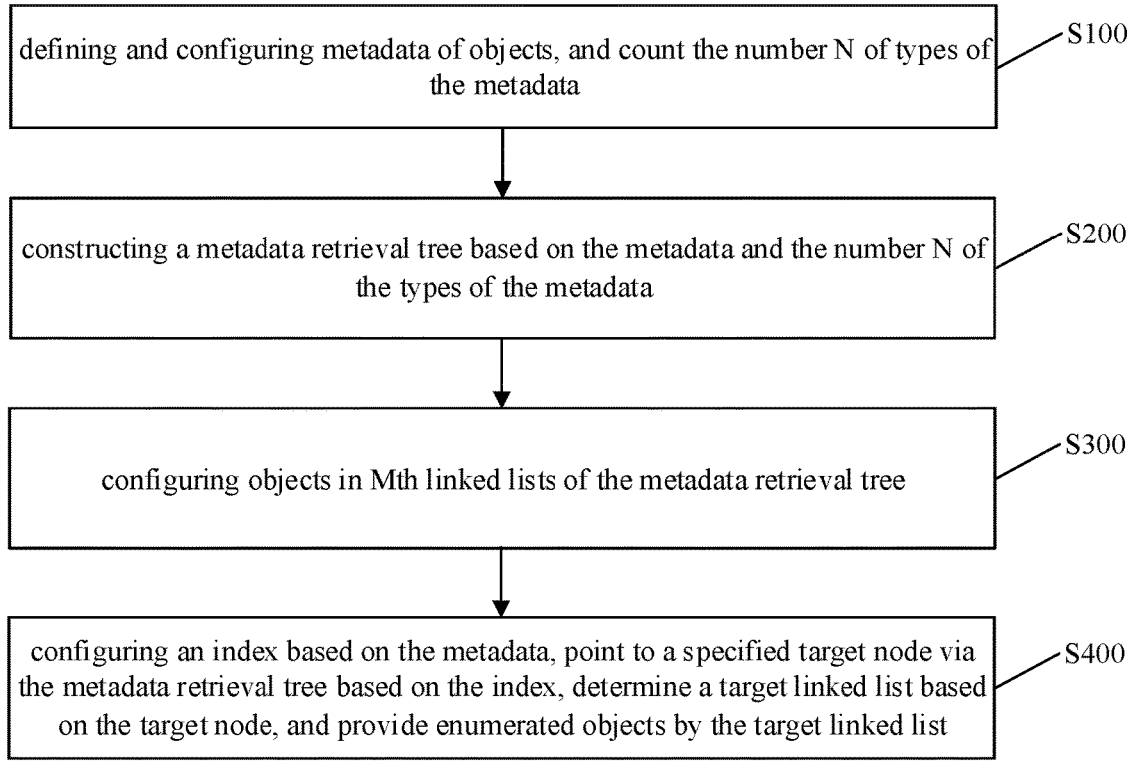
FIG. 1 is a schematic flowchart of a method for retrieving and enumerating object metadata in a distributed storage system according to an embodiment of the present disclosure.

Reference numerals and meanings are as follows:
1. Processing unit, 2. Storage unit, 3. Input unit, 4. Output unit, 5. Interface unit, and 6. Bus unit.

The implementation of objects, features and advantages of the present disclosure will be further described with reference to the accompanying drawings in conjunction with the embodiments.

DETAILED DESCRIPTION OF THE EMBODIMENTS

It is to be understood that the embodiments described herein are intended only to explain the present disclosure and are not intended to limit the present disclosure.

Referring to FIG. 1, the present disclosure provides a method for retrieving and enumerating object metadata in a distributed storage system. The method includes:

S100: metadata of objects is defined and configured, and the number N of types of the metadata is counted, each object is configured with at least one type of metadata.

Figure 2:
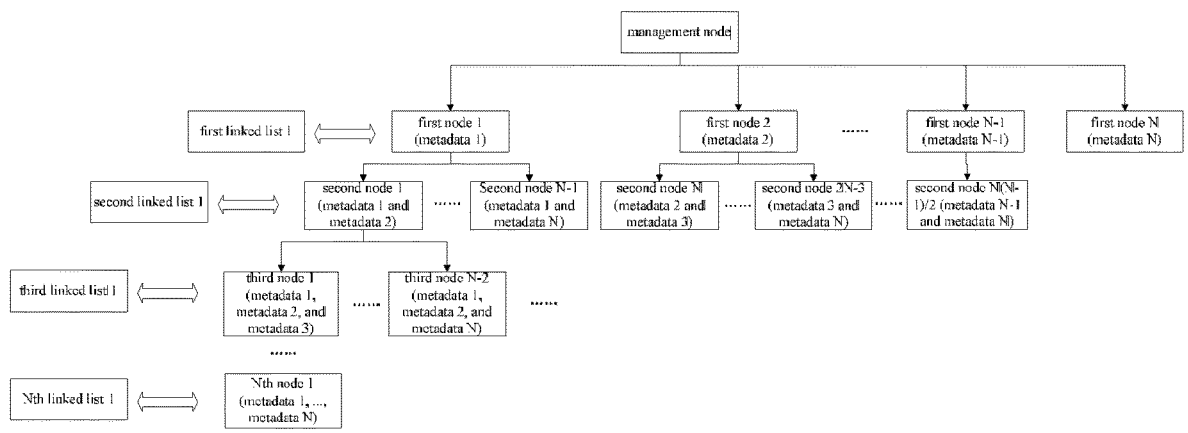
FIG. 2 is a schematic diagram of a metadata list according to an embodiment of the present disclosure.

Referring to FIG. 2, in an embodiment, a metadata list including at least N empty bits is constructed for each object.

The N empty bits in the metadata list are in one-to-one correspondence to the N metadata. For example, a first empty bit corresponds to metadata 1, a second empty bit corresponds to metadata 2, . . . , and an Nth empty bit corresponds to metadata N. The empty bits are configured with different information to indicate whether the object includes the metadata corresponding to the empty bits. In an embodiment, the empty bits are configured as 0 or 1. If an object is not configured with certain metadata, a corresponding empty bit is 0; and if an object is configured with certain metadata, a corresponding empty bit is 1. The first empty bit is specified as a high bit (or low bit), and the Nth empty bit is specified as a low bit (or high bit), so that a number including N bits is formed.

The metadata list is configured with a location counting unit, and the location counting unit determines a value formed by the numbers. The value represents which metadata an object is specifically configured with.

S200: a metadata retrieval tree according to the metadata is constructed and the number N of the types of the metadata. The metadata retrieval tree includes a zeroth node to an Nth node. The number of the zeroth node is configured as one, and the zeroth node is the root of the metadata retrieval tree. A first node to the Nth node are the branches of the metadata retrieval tree. An Mth node belongs to an (M−1)th node (M ∈ an integer, 1<=M<=N). The Mth node is configured with an ordered metadata array including M metadata in order. Each Mth node is associated with an Mth linked list. In an embodiment, when indexed to the Mth node, objects in the Mth linked list are enumerated for retrieval.

Figure 3:
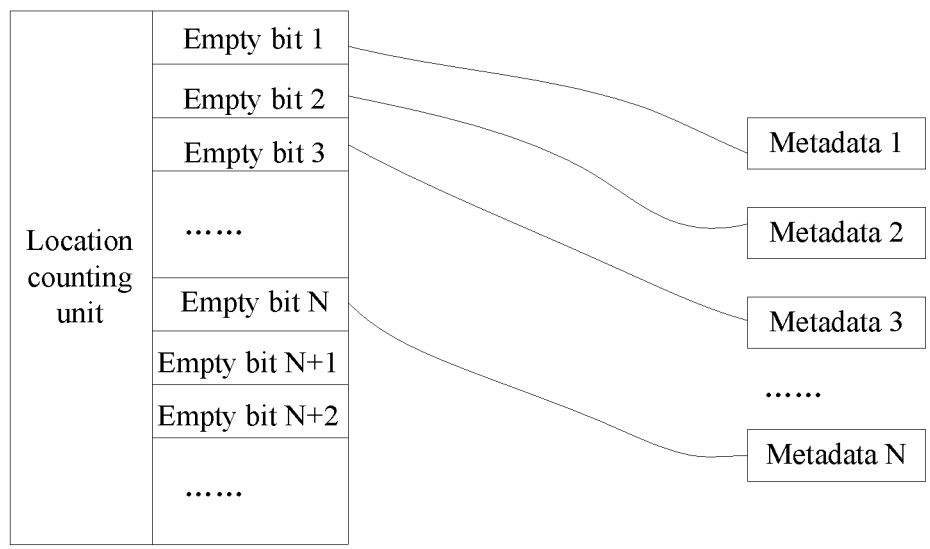
FIG. 3 is a schematic diagram of a metadata retrieval tree according to an embodiment of the present disclosure.

In an embodiment, referring to FIG. 3, the zeroth node is associated with N first nodes, each first node including one type of metadata.

The first N−1 first nodes are associated with a total of N(N−1)/2 second nodes.

The first first node is associated with N−1 second nodes. The second first node is associated with N−2 second nodes, . . . , the (N−1)th first node is associated with one second node, and the Nth first node is not associated with any second node.

The process continues until the first (N−1)th node is associated with one Nth node.

In an embodiment, elements in the metadata array of any Mth node include all elements in a metadata array of the (M−1)th node and one additional element. An additional element set is obtained by subtracting elements in metadata arrays of parent nodes from the N types of metadata. Any element from the additional element set is taken as an additional element in an ordered and non-repetitive manner and added to the corresponding Mth node in turn.

During implementation, the zeroth node of the metadata retrieval tree is configured with the functions of node addition, node deletion and node modification.

In an embodiment, the node addition includes:
a target first node is created after an existing first node, and a target second node, a target third node up to a target (N+1)th node is added automatically, a metadata array in the target second node is formed by combining a metadata array of the corresponding first node and a metadata array of the target first node, a metadata array in the target third node is formed by combining a metadata array of the corresponding second node and the metadata array of the target first node, and so on;
empty metadata in the target first node is added, and empty metadata at destination locations in the metadata arrays of the second node up to the (N+1)th node is configured;
first target metadata to be added to the target first node is specified;
retrieval is performed to determine whether the existing first node includes the same metadata as the first target metadata.
if the existing first node includes the same metadata as the first target metadata, a prompt that the first target metadata already exists and the first target metadata needs to be changed is provided.
if the existing first node does not include the same metadata as the first target metadata, the empty metadata is replaced with the first target metadata.

In an embodiment, the node deletion includes:
a first node to be deleted, and acquire second target metadata in the first node to be deleted is specified;
second target metadata in the first node up to the Nth node is deleted;
a metadata array of any Mth node is compared with the second target metadata deleted with metadata arrays of all (M−1)th nodes.

In an embodiment, the node modification includes:
a first node to be modified, and acquire third target metadata in the first node to be modified is specified;
third target metadata in the first node up to the Nth node is replaced with empty metadata.
fourth target metadata to be modified to is specified;
retrieval is performed to determine whether the existing first node includes the same metadata as the fourth target metadata;
if the existing first node includes the same metadata as the fourth target metadata, a prompt that the fourth target metadata already exists is provided;
if the existing first node does not include the same metadata as the fourth target metadata, the empty metadata is replaced with the fourth target metadata.

During implementation, the order of the metadata in the first nodes may also be changed by node modification. If the order of metadata in a first node a and a first node b is changed, metadata a in the first node a is replaced with empty metadata a, metadata b in the first node b is replaced with empty metadata b, the empty metadata b is replaced with the metadata a and the empty metadata a is replaced with the metadata b.

S300: objects are configured in the Mth linked lists, the objects are conformed to all metadata in the metadata arrays in the Mth nodes.

During implementation, each Mth linked list is configured with a unique object processing unit, and the object processing unit is configured with the functions of adding an object to the Mth linked list, deleting an object from the Mth linked list, and performing object transfer.

In an embodiment, adding an object to the Mth linked list includes:
mapping between the object processing units and the values is established;
after uploading the object, an object processing unit is determined according to a value counted by the location counting unit; and
an object name is transmitted to the object processing unit, and object matching in the Mth linked list is performed by the object processing unit according to the object name; and
if matched objects exist, a prompt indicating that the object name already exists is provided, and if no matched object exists, the object is saved into the Mth linked list by the object processing unit.

In an embodiment, deleting an object from the Mth linked list includes:
an object to be deleted and a value is determined;
a deletion instruction is transmitted to the corresponding object processing unit according to on the value;
an object name is read from the deletion instruction by the object processing unit, and the corresponding matched object is retrieved according to the object name; and
if the corresponding matched object exists, the object is deleted by the object processing unit, and if no matched object exists, a prompt indicating that no matched object exists is provided.

In an embodiment, performing object transfer includes:
any one of the following instructions is executed with a metadata list of any object in any Mth linked list as an object: a metadata addition instruction, a metadata deletion instruction and a metadata modification instruction. In an embodiment, firstly, a value of a location counting unit of the metadata list is acquired, and an object name of the metadata addition instruction, the metadata deletion instruction or the metadata modification instruction is transmitted to an object processing unit determined based on the value;
the corresponding object is copied by the object processing unit according to the object name, the object is stored at a specified position, and the corresponding object is deleted from the Mth linked list;
any one of the following instructions is executed continuously: the metadata addition instruction, the metadata deletion instruction and the metadata modification instruction, the object is extracted from the specified position, empty bits of the metadata list is modified, a value of the modified metadata list is acquired, the object to a corresponding target object processing unit is transferred, and the object is added by the object processing unit.

S400: an index is configured according to the metadata, a specified target node is pointed to via the metadata retrieval tree according to the index, a target linked list is determined according to the target node, and enumerated objects is provided by the target linked list. The index at least includes one type of metadata, and when the index includes a plurality of types of metadata, the metadata in the index is sorted in the order of the metadata in the first node. During implementation, the index is configured with an indicator.

For example, "metadata 1-metadata 2", "-" is added between metadata 1 and metadata 2 to achieve metadata separation, and quotation marks are added to denote that an object to be retrieved includes only metadata 1 and metadata 2, so that the target node pointed to by the index is a second node with only metadata 1 and metadata 2.

When corresponding index is metadata 1-metadata 2, it indicates that an object to be retrieved includes metadata 1 and metadata 2, so that the target node pointed to by the index is the second node with only metadata 1 and metadata 2, and nodes associated with the second node, for example, a third node, a fourth node, etc.

Figure 4:
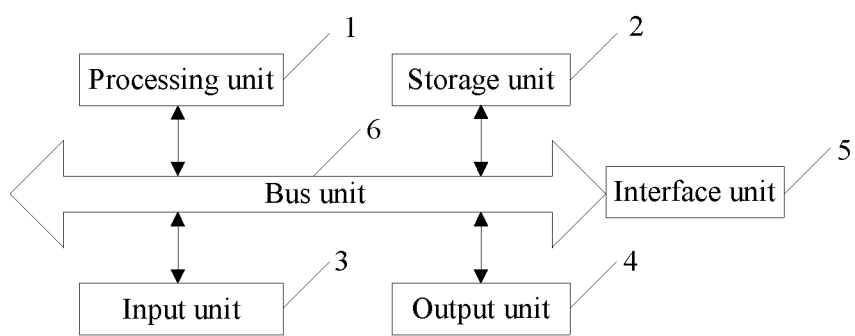
FIG. 4 is a structural diagram of an apparatus for retrieving and enumerating object metadata in a distributed storage system according to an embodiment of the present disclosure.

Referring to FIG. 4, the present disclosure further provides an apparatus for retrieving and enumerating data object metadata in a distributed storage system. The apparatus includes a processing unit 1, a storage unit 2, a bus unit 6, an input unit 3, an output unit 4, and an interface unit 5. The bus unit 6 is configured to connect the processing unit 1, the storage unit 2, the input unit 3, the output unit 4, and the interface unit 5.

The storage unit 2 is configured to store at least one instruction, and the at least one instruction is used for implementing the method for retrieving and enumerating the data object metadata in the distributed storage system;

the processing unit 1 is configured to execute the at least one instruction;

the input unit 3 is configured to input object processing parameters to the at least one instruction.

the output unit 4 is configured to display a result of the instruction.

It is to be noted that in the claims, any reference marks placed between parentheses shall not be construed as limiting the claims. The word "including" does not exclude the presence of elements or steps other than those listed in a claim. The word "a" or "one" preceding an element does not exclude the presence of a plurality of such elements. The present disclosure may be implemented by means of hardware including a plurality of distinct elements, and by means of a suitably programmed computer. In the unit claims enumerating a plurality of means, some of these means may be embodied by one and the same item of hardware. The use of the words "first", "second", "third", etc does not denote any order. These words may be interpreted as names.

While preferred embodiments of the present disclosure have been described, additional alterations and modifications to these embodiments will occur to a person skilled in the art once the basic inventive concept is known. Therefore, it is intended that the appended claims be interpreted as including the preferred embodiments and all alterations and modifications that fall within the scope of the present disclosure.

It will be apparent to a person skilled in the art that various modifications and variations may be made in the present disclosure without departing from the spirit or scope of the present disclosure. Thus, it is intended that the present disclosure cover the modifications and variations of the present disclosure provided they come within the scope of the appended claims and their equivalents.

What is claimed is:

1. A method for retrieving and enumerating object metadata in a distributed storage system, comprising:
   defining and configuring metadata of objects, and counting a number N of types of the metadata;
   constructing a metadata retrieval tree according to the metadata and the number N of the types of the metadata, the metadata retrieval tree comprises a zeroth node to an Nth node, a number of the zeroth node is configured as one, an Mth node belonging to an (M−1)th node (M∈an integer, 1<=M<=N), the Mth node is configured with an ordered metadata array comprising M metadata in order,
   each Mth node is associated with an Mth linked list;
   configuring objects in the Mth linked lists, the objects conforms to all metadata in the metadata arrays in the Mth nodes; and
   configuring an index according to the metadata, pointing to a specified target node via the metadata retrieval tree according to the index, determining a target linked list according to the target node, and providing enumerated objects by the target linked list;
   wherein, defining and configuring metadata of objects, and counting a number N of types of the metadata, comprises: constructing, for each object, a metadata list comprising N empty bits; and performing one-to-one correspondence on the N empty bits and N metadata, and configuring different information for the empty bits to indicate whether the object comprise the metadata corresponding to the empty bits, the empty bits are configured as 0 or 1, the metadata list is configured with a location counting unit, and the location counting unit is configured to determine a total value of numbers in the N empty bits in the metadata list;
   wherein each Mth linked list is configured with a unique object processing unit, and the object processing unit is configured to add an object to the Mth linked list, delete an object from the Mth linked list and perform object transfer.

2. The method for retrieving and enumerating object metadata in a distributed storage system according to claim 1, wherein the zeroth node of the metadata retrieval tree is configured with functions of node addition, node deletion and node modification.

3. The method for retrieving and enumerating object metadata in a distributed storage system according to claim 2, wherein the node addition comprises:
   creating a target first node after an existing first node, and automatically adding a target second node, a target third node up to a target (N+1)th node;
   adding empty metadata in the target first node, and configuring empty metadata at destination locations in metadata arrays of a second node up to an (N+1)th node;
   specifying first target metadata to be added to the target first node; and
   replacing the empty metadata with the first target metadata.

4. The method for retrieving and enumerating object metadata in a distributed storage system according to claim 2, wherein the node deletion comprises:
   specifying a first node to be deleted, and acquiring second target metadata in the first node to be deleted;
   deleting second target metadata in the first node up to the Nth node; and
   comparing a metadata array of any Mth node with the second target metadata deleted with metadata arrays of all (M−1)th nodes, and deleting corresponding child nodes if the metadata arrays are consistent (a metadata array of the zeroth node is set as empty).

5. The method for retrieving and enumerating object metadata in a distributed storage system according to claim 2, wherein the node modification comprises:
specifying a first node to be modified, and acquiring third target metadata in the first node to be modified;
replacing third target metadata in the first node up to the Nth node with empty metadata;
specifying fourth target metadata to be modified to; and
replacing the empty metadata with the fourth target metadata.

6. The method for retrieving and enumerating object metadata in a distributed storage system according to claim 1, wherein
adding an object to the Mth linked list comprises: establishing mapping between the object processing units and the total values of numbers, after uploading the object, determining an object processing unit according to a value counted by the location counting unit, and saving, by the object processing unit, the object into the Mth linked list;
deleting an object from the Mth linked list comprises: determining an object to be deleted and a value, transmitting a deletion instruction to a corresponding object processing unit, reading, by the object processing unit, an object name from the deletion instruction, and deleting the corresponding object; and
performing object transfer comprises:
executing any of the following instructions: a metadata addition instruction, a metadata deletion instruction and a metadata modification instruction, and transmitting an object name of the metadata addition instruction or the metadata deletion instruction or the metadata modification instruction to a corresponding object processing unit;
deleting, by the object processing unit, an object from Mth linked list; and
executing any one of the following instructions: the metadata addition instruction, the metadata deletion instruction and the metadata modification instruction, modifying empty bits of a metadata list, acquiring a value of the modified metadata list, transferring the object to a corresponding target object processing unit based on the value of the modified metadata list, and adding the object by the object processing unit.

7. An apparatus for retrieving and enumerating data object metadata in a distributed storage system, comprising a processing unit, a storage unit, a bus unit, an input unit, an output unit, and an interface unit, the bus unit is configured to connect the processing unit, the storage unit, the input unit, the output unit, and the interface unit;
the storage unit is configured to store at least one instruction, the at least one instruction, when being executed by the processing unit, causes the processing unit to:
defining and configuring metadata of objects, and counting a number N of types of the metadata;
constructing a metadata retrieval tree according to the metadata and the number N of the types of the metadata, the metadata retrieval tree comprises a zeroth node to an Nth node, a number of the zeroth node is configured as one, an Mth node belonging to an (M−1)th node (M∈an integer, 1<=M<=N), the Mth node is configured with an ordered metadata array comprising M metadata in order,
each Mth node is associated with an Mth linked list;
configuring objects in the Mth linked lists, the objects conforms to all metadata in the metadata arrays in the Mth nodes; and configuring an index according to the metadata, pointing to a specified target node via the metadata retrieval tree according to the index, determining a target linked list according to the target node, and providing enumerated objects by the target linked list;
wherein, defining and configuring metadata of objects, and counting the number N of types of the metadata, comprises: constructing, for each object, a metadata list comprising N empty bits; and performing one-to-one correspondence on the N empty bits and N metadata, and configuring different information for the empty bits to indicate whether the object comprise the metadata corresponding to the empty bits, the empty bits are configured as 0 or 1, the metadata list is configured with a location counting unit, and the location counting unit is configured to determine a total value of numbers in the N empty bits in the metadata list;
the processing unit is configured to execute the at least one instruction;
the input unit is configured to input object processing parameters to the at least one instruction; and
the output unit is configured to display a result of the at least one instruction;
wherein each Mth linked list is configured with a unique object processing unit, and the object processing unit is configured to add an object to the Mth linked list, delete an object from the Mth linked list, and perform object transfer.

8. The method for retrieving and enumerating object metadata in a distributed storage system according to claim 3, wherein a metadata array in target Kth node is formed by combining a metadata array of the corresponding first node and a metadata array of the target first node, K∈an integer, 2<=K<=N+1.

9. The method for retrieving and enumerating object metadata in a distributed storage system according to claim 3, wherein after specifying first target metadata to be added to the target first node, the method further comprises:
performing retrieval to determine whether the existing first node includes the same metadata as the first target metadata;
under a condition that the existing first node includes the same metadata as the first target metadata, providing a prompt that the first target metadata already exists and the first target metadata needs to be changed;
wherein the empty metadata is replaced with the first target metadata under a condition that the existing first node does not include the same metadata as the first target metadata.

10. The method for retrieving and enumerating object metadata in a distributed storage system according to claim 5, wherein after specifying fourth target metadata to be modified to, the method further comprises:
performing retrieval to determine whether the existing first node includes the same metadata as the fourth target metadata;
under a condition that the existing first node includes the same metadata as the fourth target metadata, providing a prompt that the fourth target metadata already exists;
Wherein the empty metadata is replaced with the fourth target metadata under a condition that the existing first node does not include the same metadata as the fourth target metadata.

11. The method for retrieving and enumerating object metadata in a distributed storage system according to claim 5, wherein under a condition that the order of metadata in a first node a and a first node b is changed, the method further comprises:
- replacing metadata a in the first node a with empty metadata a;
- replacing metadata b in the first node b with empty metadata b;
- replacing the empty metadata b with the metadata a; and
- replacing the empty metadata a with the metadata b.

12. The method for retrieving and enumerating object metadata in a distributed storage system according to claim 6, wherein after determining an object processing unit according to a value counted by the location counting unit, the method further comprises:
- transmitting an object name to the object processing unit, and object matching in the Mth linked list is performed by the object processing unit according to the object name;
- under a condition that matched objects exist, providing a prompt indicating that the object name already exists;
- wherein the object is saved into the Mth linked list by the object processing unit under a condition that no matched object exists.

13. The method for retrieving and enumerating object metadata in a distributed storage system according to claim 6, wherein after reading, by the object processing unit, an object name from the deletion instruction, the method further comprises:
- retrieving the corresponding matched object according to the object name;
- under a condition that no matched object exists, providing a prompt indicating that no matched object exists;
- wherein the object is deleted by the object processing unit under a condition that the corresponding matched object exists.

14. The method for retrieving and enumerating object metadata in a distributed storage system according to claim 1, wherein on a condition an object is not configured with certain metadata, a corresponding empty bit is 0, and on a condition an object is configured with certain metadata, a corresponding empty bit is 1.

15. The method for retrieving and enumerating object metadata in a distributed storage system according to claim 1, wherein the zeroth node is associated with N first nodes, each first node including one type of metadata, Lth first node is associated with N-L second nodes, L∈an integer, $1<=L<=N$.

16. The method for retrieving and enumerating object metadata in a distributed storage system according to claim 1, wherein elements in the metadata array of any Mth node include all elements in a metadata array of the (M−1)th node and one additional element; the method further comprises:
- obtaining an additional element set by subtracting elements in metadata arrays of parent nodes from the N types of metadata;
- taking an element from the additional element set as an additional element in an ordered and non-repetitive manner and adding the element to the corresponding Mth node in turn.

17. The method for retrieving and enumerating object metadata in a distributed storage system according to claim 1, wherein the index at least includes one type of metadata, and under a condition that the index includes a plurality of types of metadata, the metadata in the index is sorted in the order of the metadata in the first node.

18. The apparatus for retrieving and enumerating object metadata in a distributed storage system according to claim 7, wherein the zeroth node of the metadata retrieval tree is configured with functions of node addition, node deletion and node modification.

19. The apparatus for retrieving and enumerating object metadata in a distributed storage system according to claim 7, wherein each Mth linked list is configured with a unique object processing unit, and the object processing unit is configured to add an object to the Mth linked list, delete an object from the Mth linked list, and perform object transfer.

* * * * *